UNITED STATES PATENT OFFICE.

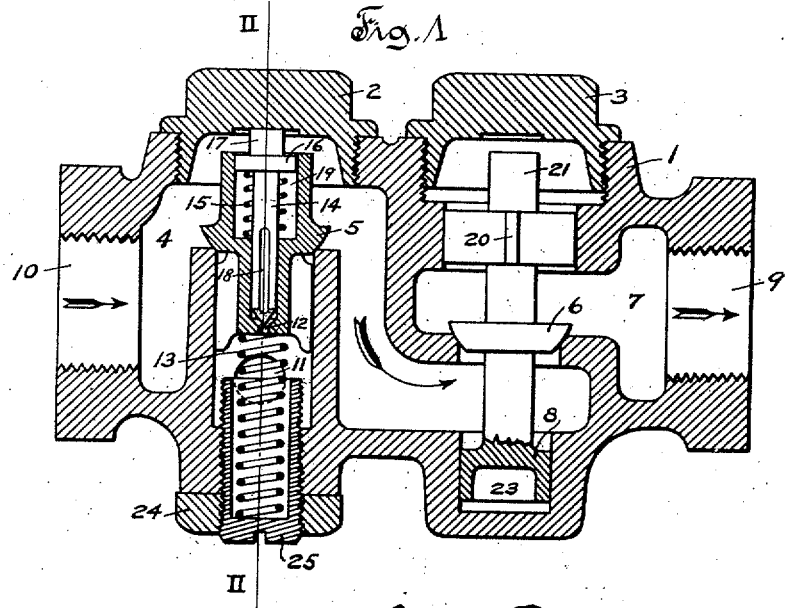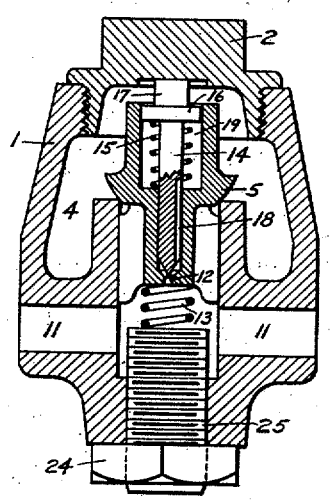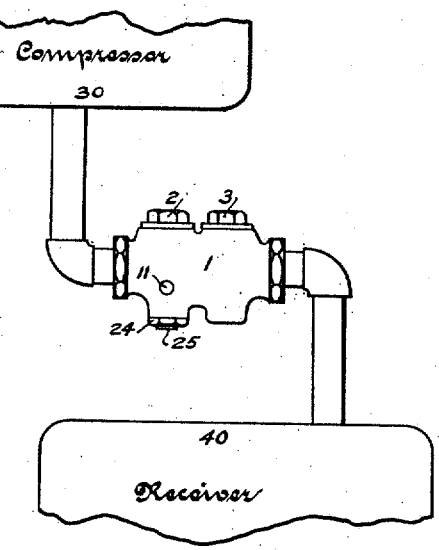
Fig. 1
Fig. 2
Fig. 3

WILLIAM OHLSEN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

UNLOADING DEVICE.

1,207,436.  Specification of Letters Patent.  Patented Dec. 5, 1916.

Application filed January 8, 1916. Serial No. 71,346.

*To all whom it may concern:*

Be it known that I, WILLIAM OHLSEN, a citizen of the United States, residing at Milwaukee, in the county of Milwaukee and State of Wisconsin, have invented a certain new and useful Improvement in Unloading Devices, of which the following is a specification.

This invention relates to improvements in the construction of unloading devices for compressors and is especially applicable to unloaders for motor driven fluid compressors in which the motor starting torque is low.

An object of the invention is to provide simple and efficient means for allowing the driving motor of a fluid compressor to attain nearly full speed, before the load is thrown in.

One of the more specific objects is to provide an unloading device which is positive in its action.

Another object is to provide a device in which the waste of compressed fluid is reduced to a minimum.

A further object is to provide a device which is automatic in its operation and which may be readily adjusted to vary its operating characteristics.

The invention is applicable generally to an installation comprising a compressor, a receiver, and a valve controlled connection between the compressor and the receiver.

The device of the present invention is an improvement over that disclosed in Patent 995,401, which discloses pressure relief means comprising a constantly open primary relief passage connecting the compressor-receiver connection to atmosphere, and a spring opened relief valve controlling a secondary relief passage leading from the connection to atmosphere. The secondary relief valve of the patented device is adapted to be opened by the spring only after the pressure in the connection has been sufficiently reduced by leakage through the primary relief passage, to permit the spring to raise the valve against the fluid pressure acting thereupon. This patented device is objectionable on account of the waste of fluid under pressure which escapes through the primary relief passage while the compressor is in operation.

The invention is also an improvement over the unloading device disclosed in Patent 1,133,792, which is an improvement over the device of Patent 995,401, and discloses a pressure relief means comprising a flow-controlled primary relief valve controlling a passage leading from the connection to atmosphere, and a spring opened secondary relief valve controlling a second relief passage to atmosphere. While the latter patented device eliminates the objectionable waste of fluid under pressure of the earlier device, the use of a flow controlled primary relief valve has in some cases been objectionable due to failure of the primary valve to operate properly.

It is the object of the present invention to provide a device which will eliminate the defects of the prior devices and which is positive and efficient in action. The improved device comprises a primary spring opened relief valve which is closed during operation of the compressor by the fluid pressure in the compressor-receiver connection. The spring which opens the valve is so constructed that the pressure exerted thereby tending to open the valve is always in excess of the maximum pressure holding the valve shut, when the compressor is not operating. The primary relief valve of the present invention as disclosed is adapted to reduce the pressure in the connection sufficiently to permit the operating spring of a relatively large secondary relief valve to become effective to open its valve and to quickly reduce the connection pressure to atmospheric. The use of a secondary relief valve is not however essential as this valve serves only to produce a more rapid unloading.

A clear conception of an embodiment of the invention may be had by referring to the drawing accompanying and forming a part of this specification, in which like reference characters designate the same or similar parts in the various views.

Figure 1 is an enlarged transverse vertical section through an unloading device embodying the invention. Fig. 2 is an enlarged vertical section through the device disclosed in Fig. 1, the section being taken along the line II—II of Fig. 1. Fig. 3 is a schematic view of the unloading device showing its relation to the compressor and the receiver.

Referring to Fig. 3, the compressor 30 which is preferably motor driven, is connected to the receiver 40 by means of a connection comprising an element 1, having valve controlled passages formed therethrough. The element 1 is connected with the compressor discharge and with the receiver by means of ordinary piping.

The element 1 comprises essentially chambers 4, 7, which are separated by a diaphragm or wall having a through port controlled by a check valve 6, see Fig. 1. The chamber 4 is provided with an inlet port 10, while the chamber 7 is provided with a discharge port 9. The ports 10, 9, chambers 4, 7, and the port controlled by the check valve 6, form a passage extending through the element 1.

The check valve 6 is provided at its lower extremity with a cushioning piston 8, reciprocable within a bore 23 in the element 1. That portion of the stem of the valve 6 above the valve is provided with guides 20 which engage suitable guideways formed on the element 1. The upper extremity of the stem of the valve 6 is provided with an abutment 21 which limits the lift of the valve. The valve 6 together with the associated elements is readily removable from within the element 1 upon removal of the cap 3.

The chamber 4 is provided with a primary relief port 12 which connects the chamber 4 with atmosphere through the chamber 19, recess 18 and passages 11, the former of which may be formed in the valves 5, 14, respectively, and the latter of which is formed in the element 1. While the port 12 has been disclosed as formed in a portion of the valve 5, this port may be formed in the element 1 as disclosed in Patent 1,133,792. The relief port 12 is controlled by means of a primary relief valve 14 having a piston 16 associated therewith. The piston 16 is reciprocable in a chamber 19 formed in a portion of the secondary relief valve 5. The valve 14 is urged away from the port 12 by means of a spring 15 which is of such strength that it will open the valve 14 against the maximum pressure attained in the chamber 4 with the pressures in the chambers 4 and 19 substantially equalized. The valve 14 is guided in the valve 5 by the engagement of the lower cylindrical portion of the valve 14 with a bore in the valve 5. A recess 18 formed in the lower cylindrical portion of the valve 14 forms a connection between the chamber 19 and the port 12. The piston 16 loosely fits the bore forming the chamber 19, thus providing leakage means past the piston from the chamber 4 to the chamber 19. The upper extremity of the stem of the valve 14 is provided with an abutment 17, which is engageable with adjacent structure to limit the travel of the valve 14.

The secondary relief valve 5 which in the present disclosure carries the primary relief valve 14, is normally closed by the pressure in the chamber 4 and is opened upon reduction of the pressure in the chamber 4 by means of a spring 13. The upper extremity of the spring 13 engages an end surface of the valve 5, while the lower extremity thereof engages a surface of the adjustable screw plug 25. The screw plug 25 is adjustable within the element 1 to vary the compression of the spring 13 and may be locked in adjusted position by means of a suitable lock nut 24. The spring 13 may be entirely removed from within the element 1 upon removal of the plug 25. The valves 5, 14, and the associated elements may be removed from within the element 1 upon removal of the screw cap 2.

The operation is as follows: Assuming the compressor 30 to be inactive, the valve 5 will be held off its seat by means of the spring 13 and the port 12 will be closed by the valve 14 which is stopped by engagement of the abutment 17 with the cap 2. The spring 13 being stronger than the spring 15, the latter is compressed. The valve 6 is held closed by the excess of pressure in the chamber 7, or by gravity if the pressure in the chambers 4, 7, are equal.

When the compressor 30 is placed in operation, the quantity of air discharged into the chamber 4 gradually increases. The air admitted to the chamber 4 during starting of the compressor is discharged directly to atmosphere past the open valve 5, but as the speed of the compressor 30 approaches normal, the quantity of air increases beyond the capacity of the port opening past the valve 5. This increase in volume of the air entering the chamber 4 causes the fluid pressure upon the surfaces of the valve 5 which are exposed to the chamber 4, to become greater than the opposed spring pressure and to close the valve 5. As the valve 5 closes, the pressure in the chamber 4 opens the valve 6 and permits the compressed air to escape to the receiver 40.

As the pressure in the chamber 4 at the time of closing of the valve 5, is increasing very rapidly, and as the leakage space from the chamber 4 to the chamber 19 past the piston 16 is relatively small, the combined spring and fluid pressures tending to open the valve 14 will be less than the pressure in the chamber 4 acting to close the valve 14, with the result that this valve 14 will remain closed even after the valve 5 has seated and during the entire time that the compressor 30 is in operation. When the operation of the compressor ceases, the fluid pressures in the chambers 4, 19, quickly equalize around the piston 16 and the spring 15 becomes effective to open the valve 14. Compressed air then flows from the chamber 4 past the piston 16, through the chamber 19, groove 18, and ports 12, 11, to atmosphere, the valve 14 being meanwhile poised in open position by the opposed pressures thereon. When sufficient air has escaped from the chamber 4 through the port 12 to permit the spring 13 to become effective to open the valve 5 against the pressure in the chamber 4, the valve 5 is suddenly opened by the spring and the pressure in the chamber 4 is quickly reduced to atmospheric.

It is important that the pressure exerted by the spring 15 tending to open the valve 14, be greater than the unbalanced fluid pressure tending to close the valve, when the compressor is inactive, so that the valve 14 will remain open and the leakage of air from the chamber 4 to atmosphere will continue. The use of a fluid pressure controlled primary relief valve 14 eliminates the uncertainty of operation of the flow controlled device of the prior art and produces a device which is positive in its action. By mounting one valve 14 within the other valve 5, a compact, readily machinable and accessible structure is provided. The closing of the valve 14 by the opening of the valve 5 also produces a maximum effective pressure area upon which the compressed fluid can act to close the valve 5.

It should be understood that it is not desired to be limited to the exact details of construction shown and described, for obvious modifications will occur to a person skilled in the art.

It is claimed and desired to secure by Letters Patent,—

1. In combination, a compressor, a receiver, a connection between said compressor and said receiver, and pressure relief means for said connection comprising a chamber communicating by a port with atmosphere, a piston in said chamber having one face subjected to connection pressure and having its opposite face subjected to the pressure on the port side of said chamber, leakage means past said piston, a valve connected to said piston and controlling said port, and means for urging said valve away from said port, the pressure exerted by said means being in excess of the maximum pressure holding said valve shut when said compressor is not operating.

2. In combination, a compressor, a receiver, a connection between said compressor and said receiver, a pressure relief means for said connection comprising a chamber having a bore and communicating by a port with atmosphere, a piston loosely fitting said bore, said piston having one face subjected to connection pressure and having its opposite face subjected to the pressure on the port side of said chamber, a valve connected to said piston and controlling said port, and a spring for urging said valve away from said port, the pressure exerted by said spring being in excess of the maximum pressure holding said valve shut when said compressor is not operating.

3. In combination, a compressor, a receiver, a connection between said compressor and said receiver, the passage through said connection communicating with atmosphere by a plurality of ports, and spring-opened valves controlling said ports, one of said valves being carried by another of said valves.

4. In combination, a compressor, a receiver, a connection between said compressor and said receiver, a passage through said connection communicating with atmosphere by a plurality of ports, and valves operable by static pressure in said connection for controlling said ports.

5. In combination, a compressor, a receiver, a connection between said compressor and said receiver, a valve in said connection, the passage through said connection communicating with atmosphere by a plurality of ports, a second valve for controlling one of said ports, a third valve controlling another of said ports, said valve being operable by pressure to close the same, and means for opening said third valve against maximum pressure in said connection when said compressor is not operating.

6. In combination, a compressor, a receiver, a connection between said compressor and said receiver, a passage through said connection communicating with atmosphere by a plurality of ports, and valves operable by pressure in said connection for controlling said ports, the axes of said valves being transverse relative to the direction of flow through said connection.

In testimony whereof, the signature of the inventor is affixed hereto.

WILLIAM OHLSEN.